Figure 1:
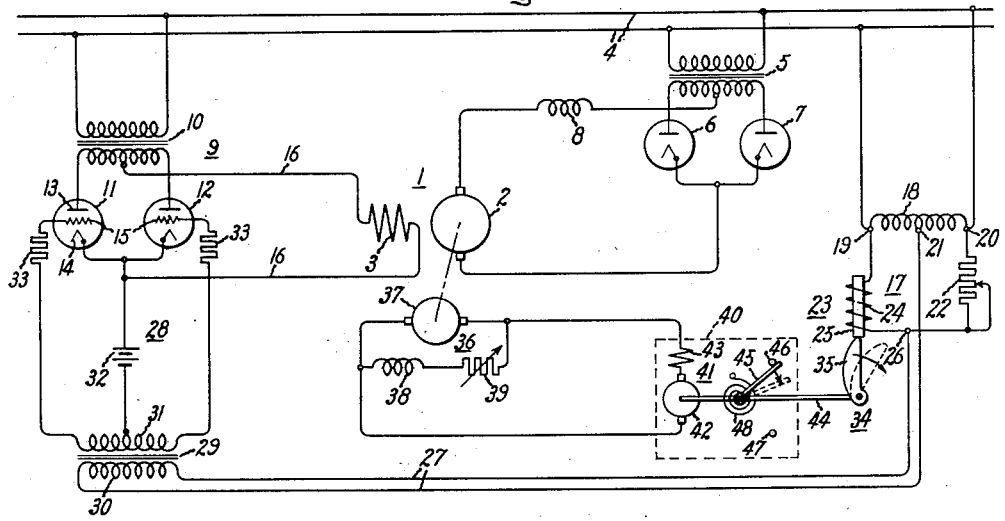

Jan. 28, 1941.　　　　G. W. GARMAN　　　　2,229,968

ELECTRIC VALVE CIRCUITS

Filed Dec. 14, 1937

Inventor:
George W. Garman,
by Harry E. Dunham
His Attorney.

Patented Jan. 28, 1941

2,229,968

UNITED STATES PATENT OFFICE 2,229,968

ELECTRIC VALVE CIRCUITS

George W. Garman, Scotia, N. Y., assignor to General Electric Company, a corporation of New York Application December 14, 1937, Serial No. 179,709

11 Claims. (Cl. 172—239)

My invention relates to electric valve circuits and more particularly to phase shifting circuits for controlling electric valve means.

It has been found that electric valve means of the type employing ionizable mediums, such as gases and vapors, may be very satisfactorily controlled by impressing on the control members thereof periodic or alternating voltages which are variable in phase with respect to the applied anode-cathode voltages. Various types of phase shifting circuits have been employed for this purpose. Many phase shifting circuits of the static impedance type include elements such as inductances and resistances which have non-linear relationships between the impedances thereof and a controlling influence which acts on the impedance elements to effect change in the impedance. One type of phase shifting circuit of this nature uses a variable inductance member of the type having relatively movable winding and core structures. Of course, in order to obtain the variation in inductance to control the phase of an output voltage of the phase shifting circuit, the core member or the winding must be moved. It is known that the inductance of the winding does not vary in a linear relation with respect to the displacement of the core member. In many applications there is a need for a control circuit of this nature which maintains a predetermined relation or a linear relation between a controlling influence and the inductance of the winding. I provide an improved phase shifting circuit for the control of electric valve means whereby such a relation may be maintained and whereby a predetermined relation or a linear relation may be maintained between an output characteristic of the electric valve and a controlling influence.

It has been found in the control of electric valve means by the use of static impedance phase shifting circuits that it is desirable in many applications to obtain a predetermined relation, such as a linear relation, between the phase of the output voltage of the phase shifting circuit and the controlling influence to compensate for nonlinear characteristics of an associated circuit which is energized from the electric valve means. For example, in the control of dynamo-electric machines by the use of electric valve means, it is frequently desirable to obtain a predetermined relation between the phase shift of the voltages impressed on the control members of the electric valve means and the speed of the machine. In order to obtain this relation it is necessary to compensate for the nonlinear relation between the output voltage of the electric valve means as a function of phase shift of the control voltage, and to compensate for the nonlinear relation between the speed of the machine and the field current of the machine.

It is an object of my invention to provide a new and improved electric control circuit.

It is another object of my invention to provide a new and improved phase shifting circuit.

It is a further object of my invention to provide a new and improved phase shifting circuit for controlling electric valve apparatus whereby a linear relation is maintained between an output characteristic of the electric valve means and a controlling influence.

In accordance with one of the illustrated embodiments of my invention, I provide a new and improved phase shifting circuit for controlling electric valve means which in turn control a dynamo-electric machine. The phase shifting circuit includes a variable impedance element having a nonlinear characteristic such as a variable inductance member comprising relatively movable winding and core members which control the phase of the voltage of a control circuit. The electric valve means controls the energization of a field winding of the dynamo-electric machine. In order to obtain a linear relation between an output characteristic, such as the output voltage of the electric valve means and a controlling influence derived from the dynamo-electric machine, I provide an eccentric or a cam which controls the position of the core member relative to the associated winding. The eccentric or cam is actuated by a pilot generator which is mechanically coupled to the dynamo-electric machine to be controlled and a torque motor which is energized from the pilot generator.

Figure 2:
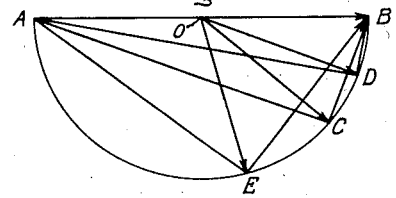
Figure 5:
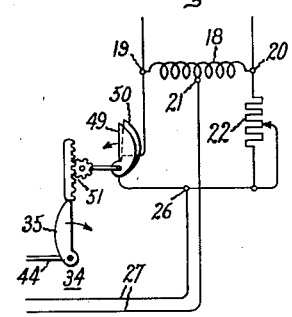
Figure 4:
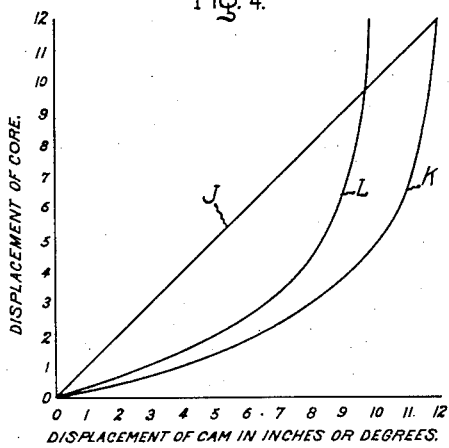
Figure 3:
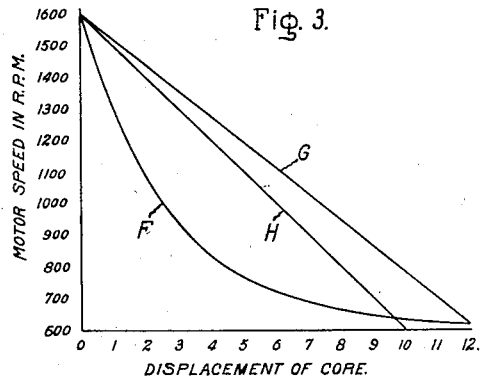

For a better understanding of my invention, reference may be had to the following description taken in connection with the accompanying drawing and its scope will be pointed out in the appended claims. Fig. 1 diagrammatically illustrates an embodiment of my invention as applied to an electric valve circuit for controlling the speed of a direct current motor, and Figs. 2–4 represent certain operating characteristics of the motor and the control circuit. Fig. 5 illustrates diagrammatically another embodiment of my invention as applied to a phase shifting circuit including a variable capacitance element.

In Fig. 1 of the accompanying drawing, I have diagrammatically illustrated my invention as applied to an electric valve translating system for controlling a dynamo-electric machine I, which may be of the direct current type, having an armature member 2 and a field or excitation winding 3. The armature member 2 may be energized from an alternating current circuit 4 through a transformer 5 and electric valves 6 and 7. The electric valves 6 and 7 may be of the type employing ionizable mediums such as gases or vapors. A smoothing inductive reactance 8 may be connected in series relation with the armature 2.

In order to control the energization of the field or excitation winding 3, and hence to control an operating condition or an electrical condition of the dynamo-electric machine, I provide a circuit 9 including a transformer 10 and electric valve means 11 and 12 which are preferably of the type employing an ionizable medium such as a gas or a vapor. Each of the electric valves 11 and 12 includes an anode 13, a cathode 14 and a control member 15 which controls the conductivity thereof. An output circuit 16 of the electric valves 11 and 12 is connected to winding 3 of machine 1.

I provide a phase shifting circuit 17 including a winding 18 which is energized from the alternating current circuit 4 and which is provided with terminal connections 19 and 20 and a connection 21 which is electrically intermediate the terminal connections. A resistance 22, which may be variable, is connected to terminal 20 and a variable inductance member 23 is connected to terminal 19. The variable inductance member 23 comprises a relatively movable winding 24 and an associated core structure or member 25. The core structure 25 may be arranged to be displaced relative to the winding 24 to control the inductance thereof. A common juncture 26 of the winding 24 and the resistance 22 and the intermediate connection 21 are connected to a control or output circuit 27. Control or excitation circuit 28 is provided to control the conductivities of electric valves 11 and 12 and may comprise a transformer 29 having a primary winding 30 and a secondary winding 31. Although the phase shifting circuit has been shown as being of the type including an inductance and a resistance, it is to be understood that other types of phase shifting circuits well known in the art may be employed, such as those including various combinations of resistances, inductances and capacitances. Any conventional source of negative unidirectional biasing potential, such as a battery 32, may be employed to introduce a negative unidirectional biasing potential in the excitation circuit 28, and current limiting resistances 33 may be connected in series relation with the control members 15.

As an agency for controlling the position of the core member 25 relative to the winding 24 to maintain a predetermined relation between the inductance of winding 24 and a predetermined controlling influence, I provide an eccentric or cam 34 having a surface 35 on which the core member 25 rides and having a nonlinear motion transmitting characteristic. It is to be understood that I may employ any other suitable arrangement, such as a properly proportioned inclined surface or plane having a nonlinear motion transmitting characteristic, to obtain a desired control or positioning of the core member 25 in accordance with the predetermined controlling influence. The surface 35 of the cam 34 may be proportioned to maintain a predetermined relation, such as a predetermined rate of change between the phase shift of the voltage of control circuit 27 and an output characteristic of electric valves 11 and 12, such as the direct current voltage of circuit 16. If desired, the surface 35 may be proportioned to maintain a linear relation between the phase shift of the voltage of circuit 27 and the voltage of circuit 16.

To obtain a predetermined controlling influence which varies as an electrical characteristic or as an operating condition of the dynamo-electric machine 1, I provide a pilot generator 36 which may be mechanically coupled to the machine 1. The pilot generator 36 may be arranged to produce a voltage which varies in accordance with the speed of machine 1 and may include an armature member 37, a field member 38 and a variable or adjustable resistance 39. As a suitable means for producing a motion to control the position of the cam 34 in accordance with the controlling influence or, in other words, in accordance with the output voltage of the pilot generator 36, I provide any suitable positioning means 40. The positioning means 40 may comprise a torque motor 41 including an armature 42 and a field winding 43. The armature 42 may be connected to the cam 34 through a shaft 44. A member or arm 45 is attached to the shaft 44, and limit members or stops 46 and 47 are arranged to control the angle through which the shaft 44 may rotate, and hence control the possible range of angular displacement of the cam 34. The shaft 44 and the cam 34 may be biased to the position shown by any suitable means such as a spring 48.

The operation of the embodiment of my invention shown in Fig. 1 will be explained by considering the system when the dynamo-electric machine 1 is operating as a motor energized from the alternating current circuit 4. Unidirectional current of substantially constant value is supplied to the armature 2 through transformer 5 and electric valves 6 and 7. Variable unidirectional current is transmitted to field winding 3 of machine 1 through transformer 10 and electric valves 11 and 12. It is well understood by those skilled in the art that the voltage of circuit 16, and hence the current supplied to winding 3, varies as a function of the phase relation between the voltages impressed on control members 15 and the voltages impressed across anodes 13 and cathodes 14 of electric valves 11 and 12. The average voltage impressed on circuit 16 is maximum when there is substantial phase coincidence between these voltages; that is, the average voltage is maximum when the electric valves are rendered conductive at the beginning of the positive half-cycles of the applied anode-cathode voltages. When the circuit is highly inductive, the average current is substantially zero when the voltages impressed on the control members 15 lag the respective anode-cathode voltages by substantially 90 degrees. Of course, the voltage of the circuit 16 assumes corresponding intermediate values for intermediate angles of phase displacement.

The phase of the voltages impressed on control members 15 of electric valves 11 and 12 may be initially adjusted by means of the adjustable resistance 22 in the phase shifting circuit 17. Let it be assumed that the resistance 22 is adjusted so that the voltages impressed on control members 15 lag the respective anode-cathode voltages by an appreciable angle. Resistance 39 in the field circuit of the pilot generator 36 is also adjusted so that the terminal voltage thereof attains a sufficient value for the desired speed of the dynamo-electric machine 1 so that the arm 45 floats between the stop members 46 and 41. Of course, the cam 34 is rotated in a clockwise direction from the position shown by the solid lines and the core member 25 rides on the surface 35. Reference may be had to the vector diagram of Fig. 2 to explain the operation of the circuit 17 and the electric valves 11 and 12. The vector AB may be employed to represent the alternating voltage of circuit 4 and may also be employed to represent the voltage impressed on the anode of one of the electric valves, such as the electric valve 11. The point 0 represents the potential of the intermediate connection 21 of winding 18. Vector AC represents the voltage appearing across the terminals of adjustable resistance 22, and vector CB represents the voltage appearing across the terminals of winding 24. Of course, vector OC represents the voltage of control circuit 27 and hence represents the phase of the voltage impressed on control member 15 of electric valve 11. If it be assumed that the speed of the machine 1 increases to a value above the predetermined value to be maintained, the voltage of the pilot generator 36 is increased to cause an increase in the energization of the torque motor 41, causing the arm 45 to rotate in the direction indicated by the arrow. As a result thereof, the cam 34 will be moved in a clockwise direction, lowering the position of the core member 25 of the inductance 23 which rides along the surface 35 of the cam. By virtue of this downward movement of core 25, the inductance of the winding 24 is substantially decreased effecting an advancement in phase of the voltage of circuit 27 to the position indicated by vector OD. As a result of the advancement in phase of the voltage of circuit 27 relative to the voltage of circuit 4, the average voltage of circuit 16 is increased, effecting a corresponding increase in the energization of excitation winding 3 of machine 1 and thereby tending to reduce the speed of machine 1 to the predetermined value to be maintained. Conversely, if the speed of the machine 1 tends to decrease to a value below the predetermined value to be maintained, the voltage of the pilot generator 36 will decrease, thereby effecting a decrease in the energization of the torque motor 41, which controls the cam 34, tending to raise the core member 25 relative to the winding 34 and thereby increase the inductance of the winding 24 and effect a retardation in the phase of the voltage of control circuit 27 relative to the voltage of circuit 4. Under this condition, the voltage of circuit 27 may be represented by a vector OE. Because of this retardation in phase of the voltage of circuit 27, the conductivities of the electric valves 11 and 12 will be decreased, effecting a decrease in the average voltage of circuit 16 and hence effecting a corresponding decrease in the energization of winding 3. The speed of the machine 1 will be correspondingly increased, tending to restore the speed to the desired value.

As an example of the manner in which the cam 34 may be proportioned, reference may be had to the curves represented in Fig. 3 where curve F represents the motor speed as a function of the displacement of the core member 25. If it is desired to obtain a speed characteristic of the machine 1 which corresponds to the curves G or H, the surface 35 of the cam 34 may be designed to accomplish this result. Curve J of Fig. 4 represents the linear relation between the movement of the cam 34 and the displacement of the core 25, and curves K and L represent the curves corresponding to curves G and H, respectively, of Fig. 3. In other words, curves K and L represent the contour of the surface 35 of cam 34 in order to obtain the respective linear speed relationships as represented by curves G and H.

Fig. 5 of the drawing illustrates another embodiment of my invention as applied to a phase shifting circuit including a variable capacitance having relatively movable plates 49 and 50. The plate 49 is arranged to rotate in a counterclockwise direction relative to the plate 50 to control the effective value of the capacitive reactance. As a suitable means for controlling the position of the plate 49, I employ any suitable arrangement for translating the linear motion of the cam 34 to rotary motion. One way in which this may be accomplished is by the use of a rack and pinion 51. The cam 34 controls the position of the plate 49 and hence the capacitive reactance in order to compensate for nonlinearities in associated circuits to be controlled. For example, if it is desired to use an impedance phase shifting circuit of this type in connection with the control of the speed of a motor, such as that illustrated in Fig. 1, the circuit 27 may be connected to the excitation circuit 26 to obtain a linear relation between the shift in phase of the voltage of circuit 27 relative to the speed of the dynamo-electric machine. Of course, when the phase shifting circuit shown in Fig. 5 is employed it is necessary to reverse the connections of the secondary winding 31 of transformer 29. By virtue of this arrangement, a predetermined relation or a linear relation may be maintained between the phase shift of the voltage of circuit 27 and an output characteristic of the electric valves, such as the voltage of circuit 16. Furthermore, by the proper proportioning of the cam surface 35 a predetermined relation may be maintained between the phase of the voltage of circuit 27 and the speed of the dynamo-electric machine. In other words, the cam surface 35 maintains a predetermined rate of change, such as a linear rate of change, between the phase of the voltage of circuit 27 and the controlling influence which is the speed of the dynamo-electric machine.

Although I have shown specific embodiments of my invention as applied to impedance phase shifting circuits including a variable inductance and a variable capacitance it is to be understood that my invention may be applied to phase shifting circuits including a variable resistance element having a nonlinear relation between the effective resistance thereof and the operation of relatively movable parts of the resistance. A suitable eccentric or cam member may be associated with the movable member of the resistance to obtain a predetermined relation between the phase shift of the output voltage of the phase shifting circuit and any controlling influence.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, electric valve translating apparatus comprising electric valve means having a control member, a load circuit connected to said translating apparatus, an alternating current circuit, an excitation circuit for energizing said control member comprising a phase shifting circuit energized from said alternating current circuit for producing a voltage variable in phase with respect to the voltage of said alternating current circuit and comprising a variable impedance element having relatively movable members, an output circuit connected to said phase shifting circuit, means for producing a motion responsive to a predetermined controlling influence, and means having a nonlinear motion transmitting characteristic connected to said last mentioned means and one of said relatively movable members for moving said one member and to maintain a predetermined linear rate of change of said predetermined controlling influence with respect to the magnitude of the voltage of said load circuit.

2. In combination, electric translating apparatus including electric valve means having a control member, a load circuit, an alternating current circuit, an excitation circuit for energizing said control member including a phase shifting circuit energized from said alternating current circuit for producing a voltage variable in phase with respect to the voltage of said alternating current circuit and comprising a variable impedance element having relatively movable members, an output circuit connected to said phase shifting circuit, means comprising a cam having a nonlinear motion transmitting characteristic for moving one of said members, motion producing means for controlling said cam in response to a predetermined controlling influence for maintaining a linear rate of change between the voltage of said load circuit and the motion of said last mentioned means, and means for mechanically coupling said cam and said motion producing means.

3. In combination, electric translating apparatus including electric valve means having a control member, a load circuit energized by said electric valve means, an alternating current circuit, an excitation circuit for energizing said control member including a phase shifting circuit energized from said alternating current circuit for producing a voltage variable in phase with respect to the voltage of said alternating current circuit and comprising a variable impedance element having relatively movable members, an output circuit connected to said phase shifting circuit, means comprising a cam having a nonlinear motion transmitting characteristic for moving one of said members, motion producing means for positioning said cam in response to a predetermined controlling influence, said cam being proportioned to maintain a predetermined linear rate of change between the voltage of said load circuit and said controlling influence, and means for mechanically coupling said cam and said motion producing means.

4. In combination, electric translating apparatus comprising an electric valve means, a load circuit connected to said electric valve means, an alternating current circuit, an excitation circuit for energizing said control member including a phase shifting circuit energized from said alternating current circuit for producing a voltage variable in phase with respect to the voltage of said alternating current circuit and comprising a variable inductance having associated relatively movable winding and core members, an output circuit connected to said phase shifting circuit, means comprising a cam having a nonlinear motion transmitting characteristic for moving one of said members, motion producing means for controlling said cam in response to a predetermined controlling influence, and mechanical coupling means for connecting said cam and said motion producing means.

5. In combination, electric translating apparatus comprising electric valve means having a control member, a load circuit energized from said electric valve means, an alternating current circuit, an excitation circuit for energizing said control member including a phase shifting circuit energized from said alternating current circuit for producing a voltage variable in phase with respect to the voltage of said alternating current circuit and comprising a variable inductance having associated winding and core members, an output circuit connected to said phase shifting circuit, a cam having a nonlinear motion transmitting characteristic for moving said core member relative to said winding to control the inductance thereof, motion producing means for controlling said cam in response to a predetermined controlling influence, said cam being arranged to maintain a predetermined linear relation between the magnitude of the voltage of said load circuit and said controlling influence, and means for mechanically coupling said cam and said last mentioned means.

6. In combination, a dynamo-electric machine of the direct current type having armature and field windings, an alternating current circuit, electric translating apparatus for energizing one of said windings from said alternating current circuit and comprising electric valve means having a control member for controlling the conductivity thereof, an excitation circuit for energizing said control member including a phase shifting circuit comprising a winding energized from said alternating current circuit and having a pair of terminal connections and a connection electrically intermediate said terminal connections, a resistance connected to one of said terminal connections and a variable inductance connected to the other of said terminal connections and having a winding and a relatively movable core member, an output circuit connected across the intermediate connection and the juncture of said resistance and said winding, a cam having a nonlinear motion transmitting characteristic for moving said core member to control the inductance of said winding, and means for controlling said cam in accordance with a predetermined controlling influence derived from said machine, said cam being arranged to obtain a predetermined linear relation between the phase shift of the voltage of said output circuit and said controlling influence.

7. In combination, an alternating current circuit, a load circuit, electric translating apparatus connected between said alternating current circuit and said load circuit and comprising an electric valve means having a control member for controlling the conductivity thereof, a phase shifting circuit energized from said alternating current circuit for producing a voltage variable in phase with respect to the voltage of said alternating current circuit and comprising a variable inductance having associated relatively movable winding and core members, a control circuit connected between said phase shifting circuit and said control member, means comprising a cam having a nonlinear motion transmitting characteristic for moving one of said members to control the inductance of said winding, motion producing means for positioning said cam in response to a predetermined controlling influence, said cam being arranged to maintain a linear relation between a characteristic of said electric valve means and said controlling influence, and means for mechanically coupling said cam and said motion producing means.

8. In combination, an alternating current circuit, a dynamo-electric machine, electric translating apparatus including electric valve means for energizing said machine, said electric valve means having a control member for controlling the conductivity thereof, a phase shifting circuit energized from said alternating current circuit for producing a voltage variable in phase with respect to the voltage of said alternating current circuit and comprising a variable inductance having associated relatively movable winding and core members, a control circuit connected between said phase shifting circuit and said control member, means comprising a cam having a nonlinear motion transmitting characteristic for moving one of said members to control the inductance of said winding, motion producing means for positioning said cam in response to a predetermined controlling influence which varies in response to an operating condition of said machine, said cam being arranged to maintain a linear relation between said operating condition and an output characteristic of said electric valve means, and means for mechanically coupling said cam and said motion producing means.

9. In combination, electric translating apparatus comprising electric valve means having a control member for controlling the conductivity thereof, a load circuit energized from said electric valve means, an alternating current circuit, an excitation circuit for energizing said control member including a phase shifting circuit energized from said alternating current circuit for producing a voltage variable in phase with respect to the voltage of said alternating current circuit and comprising a variable capacitance element having relatively movable plates, an output circuit connected to said phase shifting circuit, means comprising a cam having a nonlinear motion transmitting characteristic for moving one of said plates, motion producing means for positioning said cam in response to a predetermined controlling influence, and means for mechanically coupling said cam and said motion producing means.

10. In combination, an alternating current circuit, a phase shifting circuit energized from said alternating current circuit for producing a voltage variable in phase with respect to the voltage of said alternating current circuit and comprising a variable impedance element having relatively movable members, an output circuit connected to said phase shifting circuit, means for producing a motion responsive to a predetermined controlling influence and comprising a torque motor, means having a nonlinear motion transmitting characteristic between said torque motor and one of said relatively movable members for maintaining a predetermined linear rate of change of said controlling influence with respect to the phase shift of said first mentioned voltage, and mechanical coupling means connected between said torque motor and the means having a nonlinear motion transmitting characteristic.

11. In combination, electric valve translating apparatus comprising electric valve means having a control member, a load circuit connected to said translating apparatus, an alternating current circuit, an excitation circuit for energizing said control member comprising a phase shifting circuit energized from said alternating current circuit for producing a voltage variable in phase with respect to the voltage of said alternating current circuit and comprising a phase shifting device including a movable member and a stationary member, an output circuit connected between said phase shifting device and said control member, means for producing a motion responsive to a condition derived from said load circuit, and control means connected to said last mentioned means and said movable member for operating said movable member, said control means having a characteristic such that a linear rate of change is maintained between an output electrical condition of said electric valve means and the condition derived from said load circuit.

GEORGE W. GARMAN.